United States Patent [19]

Mueller

[11] Patent Number: 5,493,190
[45] Date of Patent: Feb. 20, 1996

[54] WINDSHIELD WIPER AUTO-DELAY CONTROL INTERFACE

[75] Inventor: Donald L. Mueller, Dayton, Ohio

[73] Assignee: ITT Automotive Electrical Systems, Inc., Auburn Hills, Mich.

[21] Appl. No.: 315,421

[22] Filed: Sep. 30, 1994

[51] Int. Cl.⁶ ..................................................... B60S 1/08
[52] U.S. Cl. .................... 318/443; 318/483; 318/DIG. 2; 318/444
[58] Field of Search ..................... 318/440–490, 318/DIG. 2; 15/250 C, 250.12–250.17; 73/170 R; 307/9–11

[56] References Cited

U.S. PATENT DOCUMENTS

| | | | |
|---|---|---|---|
| Re. 33,308 | 8/1990 | Millerd et al. | 318/444 |
| Re. 33,848 | 3/1992 | Shiraishi | 318/444 |
| 3,864,578 | 2/1975 | Lackey | 307/10 R |
| 4,055,772 | 10/1977 | Leung | 307/10 R |
| 4,388,574 | 6/1983 | Bois et al. | 318/443 |
| 4,527,105 | 7/1985 | Shiraishi | 318/444 |
| 4,584,487 | 4/1986 | Hesse et al. | 307/10 R |
| 4,663,575 | 5/1987 | Juzswik et al. | 318/444 |
| 4,709,998 | 11/1987 | Millerd et al. | 318/444 |
| 4,916,374 | 4/1990 | Schierbeek et al. | 318/483 |
| 4,942,349 | 7/1990 | Millerd et al. | 318/483 |
| 5,057,754 | 10/1991 | Bell | 318/483 |
| 5,117,168 | 5/1992 | Nomura et al. | 318/444 |
| 5,119,002 | 6/1992 | Kato et al. | 318/444 |
| 5,140,234 | 8/1992 | Walleafen | 318/444 |
| 5,200,676 | 4/1993 | Mueller et al. | 318/444 |
| 5,216,341 | 6/1993 | Nomura et al. | 318/444 |
| 5,239,244 | 8/1993 | Teder | 318/444 |
| 5,304,936 | 4/1994 | Buschur | 324/689 |

*Primary Examiner*—Paul Ip
*Attorney, Agent, or Firm*—Jacox, Meckstroth & Jenkins

[57] ABSTRACT

A vehicle window wiper interfacing arrangement for interconnecting a window wiper function switch, a wiper motor controller, and an auto-delay controller to permit a water drop sensor to control a window wiper delay time when a window wiper system is operated in an AUTO-DELAY mode. The auto-delay controller outputs three wiper function signals, namely OFF, LOW speed and WASH to the wiper motor controller via a single bi-directional multiplexed line. The wiper motor controller outputs a wiper position signal to the auto-delay controller via the same bi-directional multiplexed line for use by a control program to determine a proper wiper delay time period.

5 Claims, 4 Drawing Sheets

WINDSHIELD WIPER AUTO-DELAY CONTROL INTERFACE

FIELD OF THE INVENTION

This invention relates to a vehicle window wiper control interfacing arrangement, and more particularly to an arrangement for interfacing a window wiper function switch, a wiper motor controller, and an auto-delay controller to permit a water drop sensor to control a window wiper delay time period when a window wiper system is operated in an AUTO-DELAY mode.

BACKGROUND OF THE INVENTION

In addition to the basic vehicle window wiper functions of OFF, MIST (single wipe), LOW speed, and HIGH speed, it is now common to provide an AUTO-DELAY function wherein a delay time of the wipers is automatically controlled in accordance with a water drop sensor which senses the presence of water drops on a vehicle window, such as a windshield. An exemplary water drop sensor comprising a pair of electrodes disposed in association with a portion of a surface of a vehicle window within a wipe pattern is disclosed in U.S. Pat. No. 5,304,936, which patent is assigned to the assignee of the present invention.

Typically, an electronic control circuit, and more particularly an auto-delay controller controls a wiper drive motor in accordance with an output of the water drop sensor when the AUTO-DELAY function is selected. The auto-delay controller executes an auto-delay algorithm or control program to control the wiper drive motor in accordance with the water drop sensor output. The control program outputs control information to a wiper motor controller, and inputs wiper blade position information for use in controlling the wiper drive motor. Wiper position information is generated by a switching device mechanically coupled to the wiper drive motor which indicates when the wipers are in a predetermined position, for instance, an inner wipe position wherein the wiper blades are situated at the bottom of a windshield. The inner wipe position information is used as feedback to insure proper wiper blade operation and is typically routed from the switching device to the auto-delay controller through the wiper motor controller.

One arrangement for interfacing the wiper motor controller to the auto-delay controller is to provide separate input and output data lines therebetween. However, there are incremental cost and design disadvantages associated with providing separate data lines. There is also reduced circuit reliability associated with using multiple data lines.

What is needed therefore is a low cost, highly reliable arrangement for interfacing a window wiper control switch, a wiper motor controller, and an auto-delay controller to permit a water drop sensor to control a window wiper delay time period.

SUMMARY OF THE INVENTION

A primary object of the present invention is to provide a voltage multiplexed interfacing arrangement which permits input and output data to be sent across a single bi-directional communication path.

Another object of the present invention is to provide an improved interfacing arrangement for automatically controlling a window wiper delay time period when a window wiper system is operated in an AUTO-DELAY mode.

In one aspect of the invention, there is provided a window wiper control system for automatically controlling a window wiper drive motor. The window wiper control system includes a single bi-directional communication path coupling a first controller associated with a water drop sensor to a second controller associated with the window wiper drive motor, a circuit for driving a voltage on the single bi-directional communication path to one of a plurality of predetermined voltage levels, and at least one voltage sensor coupled to the first controller for sensing the voltage levels on the bi-directional communication path.

In another aspect of the invention, there is provided a window wiper control system for automatically controlling at least one window wiper when the window wiper is operated in an auto-delay mode. The window wiper control system includes a single bi-directional multiplexed data line, and an auto-delay controller connected to a water drop sensor wherein the auto-delay controller outputs a plurality of wiper control signals to the bi-directional multiplexed data line, and wherein the plurality of control signals provides control information for operating a wiper drive motor which drives the at least one wiper. The window wiper control system also includes a wiper motor controller connected to the bi-directional multiplexed data line which is responsive to the plurality of wiper control signals for controlling the drive motor. The wiper motor controller outputs a wiper position signal to the auto-delay controller via the bi-directional multiplexed data line, and the auto-delay controller determines a proper wiper delay time period in response to the water drop sensor and the wiper position signal.

In still another aspect of the invention, there is provided a method of interfacing a wiper delay controller having at least one first signal requirement to a wiper motor controller having at least one second signal requirement. The method includes the steps of providing a single bi-directional communication path having a node between the first and second controllers, and generating a signal at the node capable of satisfying both the at least one first and second signal requirements.

In a further aspect of the invention, there is provided a method of automatically controlling a window wiper drive motor when a window wiper system is operated in an auto-delay mode wherein the window wiper system includes a water drop sensor, and auto-delay controller connected to the sensor, a wiper drive motor for driving at least one wiper blade, and a wiper motor controller for controlling the wiper drive motor. The method includes the steps of providing a bi-directional communication path between the auto-delay controller and the wiper drive motor wherein the path has a node, sensing a voltage level at the node to determine a position of the at least one wiper blade, changing the voltage level in accordance with an output from the water drop sensor to control the wiper drive motor, and changing the voltage level in accordance with a position of the at least one window wiper to control an auto-delay time period of the at least one wiper.

An advantage of this circuit and method is that it provides a single design utilizing a single bi-directional communication path. Another advantage is that this circuit and method facilitates reducing design costs associated with some circuit designs of the past.

These and other objects and advantages of the invention will be apparent from the following description, the accompanying drawings and the appended claims.

DETAILED DESCRIPTION OF THE PREFERRED EMBODIMENT

Figure 1:
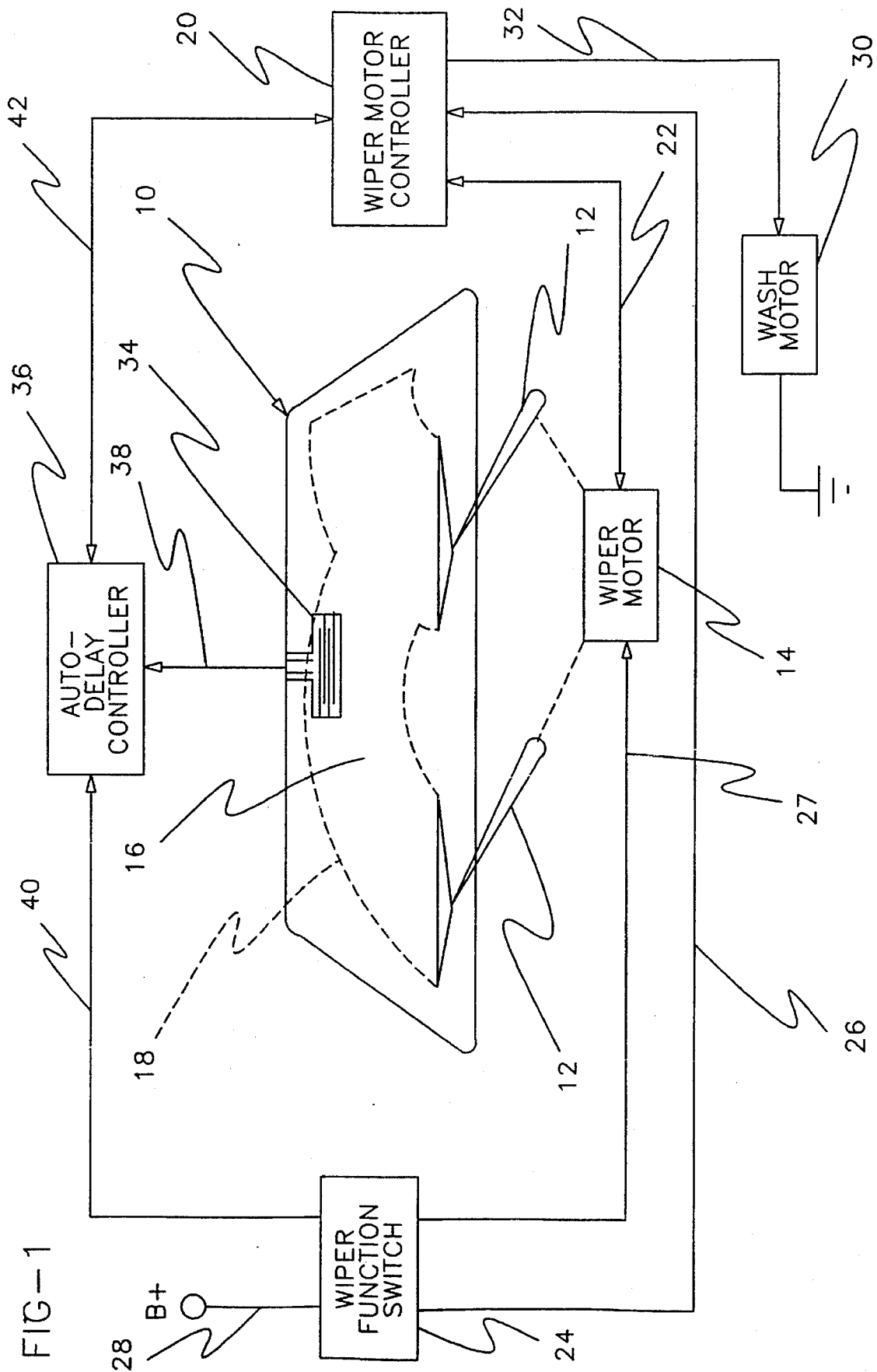
FIG. 1 is a block diagram of the window wiper system of the present invention.

Referring now to FIG. 1, a motor vehicle window or windshield 10 is provided with a pair of window or windshield wipers 12. The wipers 12 are driven by an electric wiper drive motor 14 having suitable known gear and/or linkage apparatus (not shown) coupling an output shaft (not shown) of the motor 14 to the wipers 12. When in operation, the wipers 12 sweep from an inner wipe position, as shown in FIG. 1, through a wipe area 16 defined by the broken line 18 to an outer wipe position and back to the inner wipe position in repeated cycles.

The wiper drive motor 14 may comprise a single or plural wiper motors and is controlled by an electronic wiper motor controller 20 via an output line 22 in response to a user selectable wiper function switch 24 accessible by a vehicle operator. The function switch 24 is connected to the wiper motor controller 20 via line 26 and is connected directly to the wiper drive motor 14 via line 27. A supply voltage B+ is applied to the function switch 24 via line 28. The wiper motor controller 20 also controls a wash pump motor 30 via an output line 32. The wash pump motor 30, when actuated, pumps window washer fluid, or the like from a storage reservoir to at least one discharge nozzle proximate the windshield 10.

The windshield 10 is provided with a known water drop sensor 34 comprising a pair of electrodes positioned within the wipe area 16. One suitable sensor is disclosed in U.S. Pat. No. 5,304,936, assigned to the Assignee of the present invention and which is incorporated by reference and made a part hereof. The water drop sensor 34 may be resistive in which case the electrodes are placed on the outer surface of the windshield 10 to be contacted directly by water drops. The water drop sensor 34 may also be capacitive in which case the electrodes are separated from the water drops by a dielectric coating or a layer of glass so that the capacitance between the electrodes is changed by the water drops. In either case, an electrical parameter (resistance or capacitance) is varied by water drops on the window which overlap both electrodes. Thus, the fully automatic or intermittent wiper operation is accomplished by turning the wiper drive motor 14 "on" when the sensor 34 detects sufficient water on the windshield 10, and turning the wiper drive motor 14 "off" when the sensor 34 no longer detects water drops on the windshield 10.

The sensor 34 is connected to an auto-delay controller 36 via line 38. The auto-delay controller 36 senses the electrical parameter changes of the water drop sensor 34 and then determines the proper wiper delay time period in accordance with an auto-delay algorithm or control program (not shown) executed by the auto-delay controller 36. The auto-delay controller 36 is connected to the wiper function switch 24 via line 40 to determine the particular wiper function selected for use by the control program.

The auto-delay controller 36 is also connected to the wiper motor controller 20 via a single bi-directional multiplexed line 42. The auto-delay controller 36 provides the wiper motor controller 20 with control signals across the bi-directional line 42 for controlling the wiper motor 14 when an AUTO-DELAY feature is selected, and for controlling the wash pump motor 30 when a WASH feature is selected. In addition, the wiper motor controller 20 provides the auto-delay controller 20 with a signal across the bi-directional line 42 indicative of a mechanical position of the wipers 12 which is utilized as an input variable to the control program when the AUTO-DELAY feature is selected. Thus, the mechanical position, and more particularly an inner wipe position of the wipers 12 must be determined by the auto-delay controller 36 in order to determine the proper wiper delay time. The inner wipe position is defined as the position of the wipers 12 in their rest state wherein the wiper blades are positioned adjacent the bottom edge of the windshield 10 as shown in FIG. 1.

Figure 2:
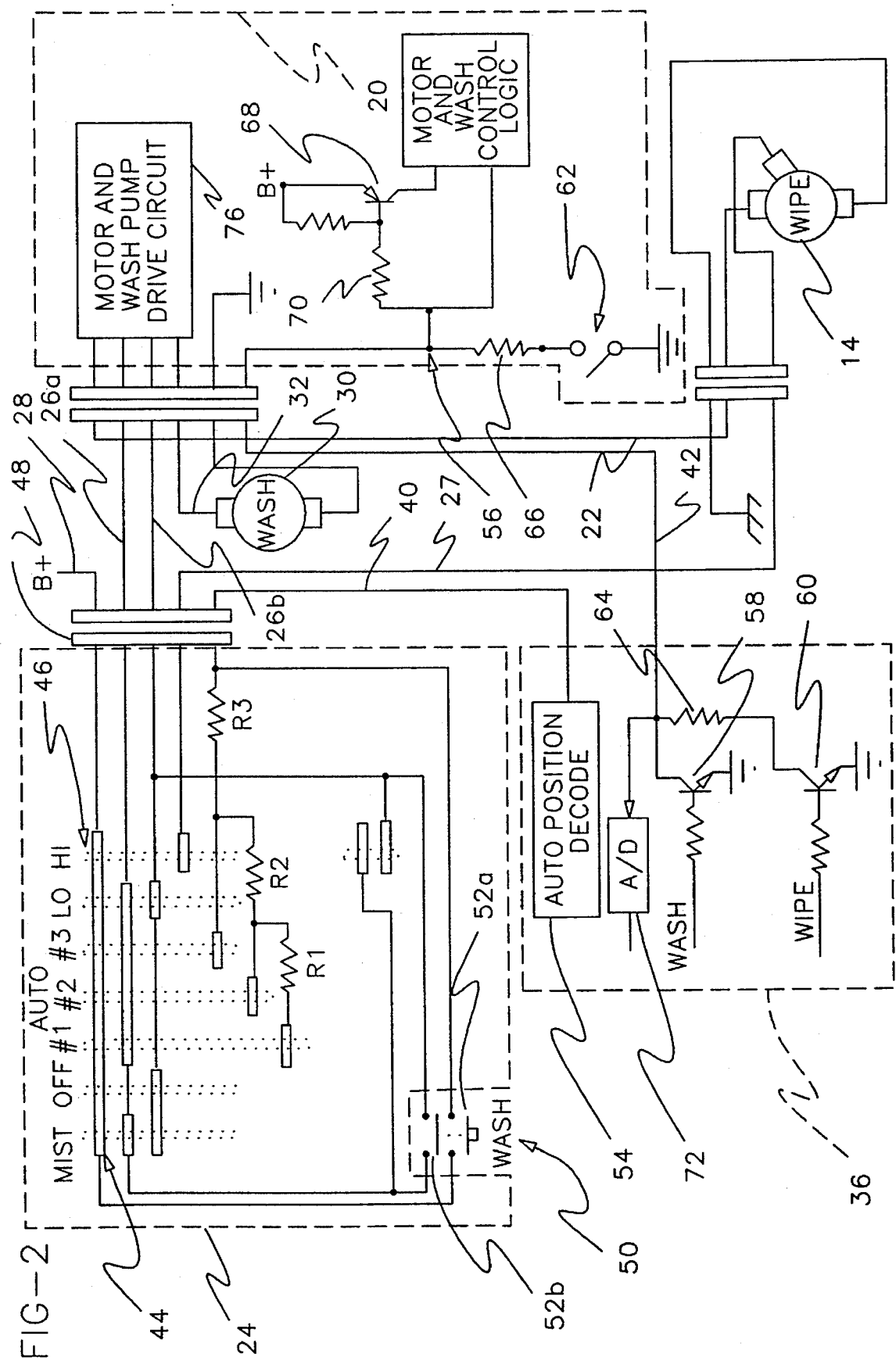
FIG. 2 is a schematic diagram illustrating an embodiment of the window wiper system shown in FIG. 1.

Referring now to FIG. 2, there is shown a preferred embodiment of the present invention. The wiper function switch 24 is a slide bar switch having a contact matrix formed from a plurality of row contacts 44 and a plurality of column contacts 46. The column contacts 46 each designate a separate wiper function MIST, OFF, SENSITIVITY #1, SENSITIVITY #2, SENSITIVITY #3, LOW speed, AND HIGH speed. The SENSITIVITY #1, #2 and #3 positions comprise the AUTO-DELAY function and provide a vehicle operator with different sensitivity levels for detecting water drops on the windshield 10. An actuator or selector lever (not shown) of the switch 24 is slidable from column to column to select the desired wiper function.

When a desired wiper function is selected, the particular column contact 46 couples the supply voltage B+ from line 28 to the row contact(s) 44 that intersect the particular column contact 46. The row contacts 44 are connected variously to lines 26a, 26b, 27 and 40 through a connector 48. Lines 26a and 26b are connected to the wiper motor controller 20, and more particularly to wiper motor and wash pump control circuitry 76 which controls the wiper motor 14 and the wash pump motor 30 in accordance with the wiper function switch 24. Line 27 is connected to a high speed winding (not shown) of the wiper motor 14 to control the HIGH speed operation of the wiper motor 14. Line 40 is discussed further below in connection with the auto-delay controller 36.

When the selector lever of the function switch 24 is held in the MIST position, the supply voltage B+ is coupled from the top row connector through the MIST column contact and to the lines 26a and 26b through the row contacts 44 for as long as the lever is held in the MIST position. When the vehicle operator releases the lever, the lever returns to the OFF position by spring action. In the OFF position, the supply voltage B+ is applied only to line 26b. In the LOW speed position, the supply voltage B+ is provided on lines 26a and 26b similar to the MIST position, the only difference being that the selector lever remains in the LOW speed position until the lever is repositioned by the vehicle operator. In the HIGH speed position, the supply voltage B+ is applied to line 27 to energize the high speed winding of the wiper drive motor 14, and the lines 26a and 26b are connected together to provide the same voltage potential on each line. In all three AUTO-DELAY positions, the supply voltage B+ is applied to line 26a, and to respective resistors R connected to line 40 through the connector 48. In the SENSITIVITY #1 position, the supply voltage B+ is applied to resistors $R_1$, $R_2$, and $R_3$ connected in series with line 40. In the SENSITIVITY #2 position, the supply voltage B+ is applied to resistors $R_2$ and $R_3$ connected in series with line 40. In the SENSITIVITY #3 position, the supply voltage B+ is applied to resistor $R_3$ connected to line 40. In addition, a WASH switch 50 is provided proximate the wiper function switch 24 which has a first pair of contacts 52a for coupling the supply voltage B+ directly to line 40 when the WASH switch 50 is depressed, and a second pair of contacts 52b for electrically connecting line 26a to line 26b to signal the wiper motor controller 20 to operate the wiper motor 14 at the LOW speed setting during the WASH operation.

Line 40 is connected to an auto position decoder 54 within the auto-delay controller 36, which decoder 54 provides decoded function switch 24 position information to the control program implemented by the controller 36. More specifically, the decoder 54 determines which AUTO-DELAY function has been selected (SENSITIVITY #1, SENSITIVITY #2, OR SENSITIVITY #3) for use by the control program in determining the proper wiper delay time, and whether or not the WASH switch 50 has been depressed. When the WASH switch 50 is depressed, the switch 50 applies B+ to line 40 through contacts 52a, and the resistors $R_1$, $R_2$ and $R_3$ form a voltage divider which permits the decoder 54 to determine whether the WASH function was selected, or which AUTO-DELAY function has been selected based upon the voltage level sensed on line 40.

The auto-delay controller 36 outputs three wiper function signals, namely OFF, LOW speed and WASH to the wiper motor controller 20, and more particularly to the motor drive logic 74 via the single multiplexed line 42. The various voltage levels associated with each wiper function is shown by the following Table 1.

TABLE 1

| WIPER FUNCTION | VOLTAGE |
| --- | --- |
| OFF | B+ |
| LOW - IW switch open | ⅔ B+ |
| LOW - IW switch closed | ⅓ B+ |
| LOW - WASH | GROUND |

The same multiplexed line 42 is used by the wiper motor controller 20 to output a wiper position signal to the auto-delay controller 36. The wiper position signal is generated by an inner wipe position switch 62 associated with the wiper drive motor 14 and is sent to the auto-delay controller 36 via the multiplexed line 42.

Figure 3:
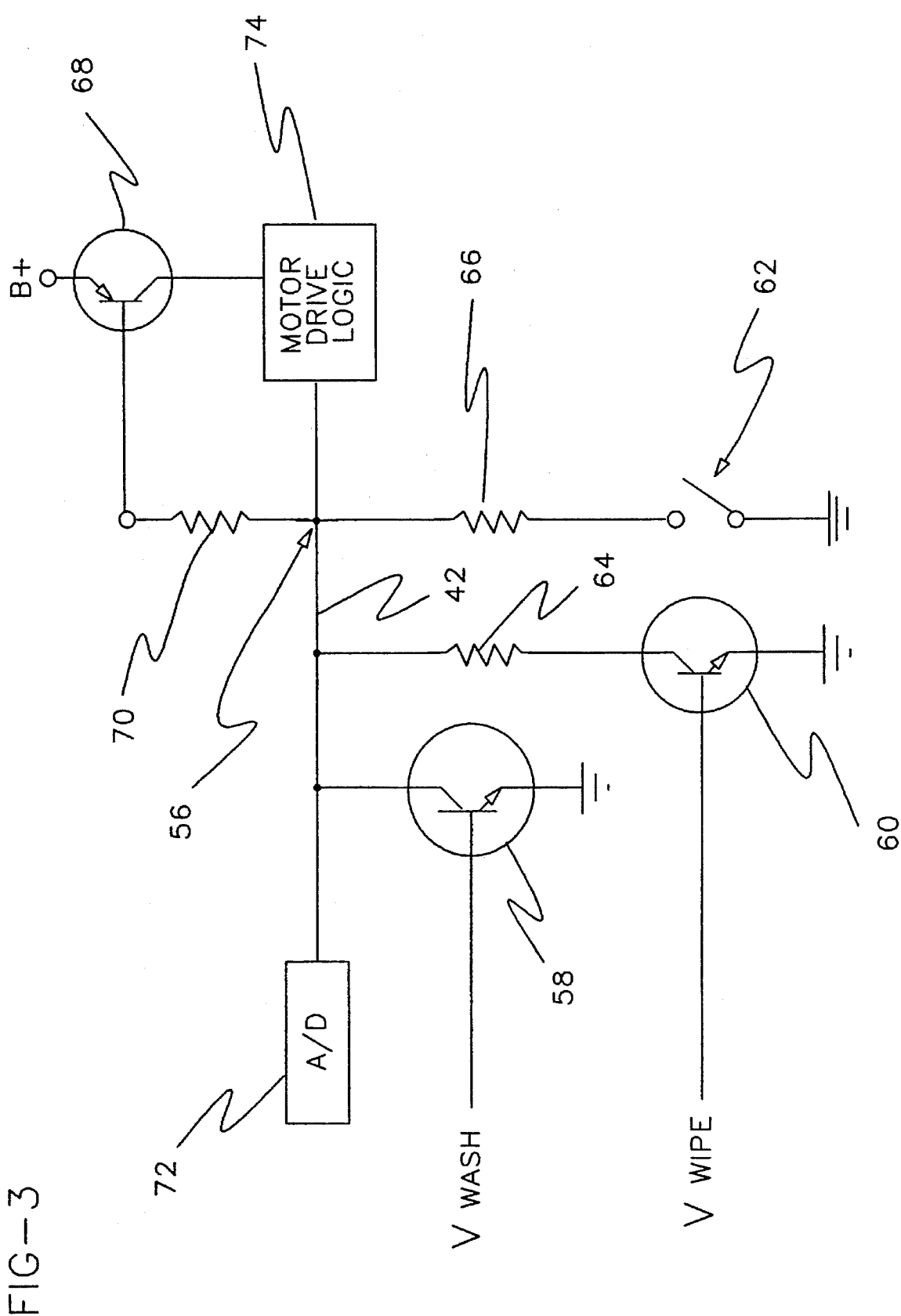
FIG. 3 is a schematic diagram of an interfacing arrangement of the present invention.

Referring now to FIG. 3, a simplified illustration of an embodiment of this invention is shown. In FIG. 3, the multiplexed line 42 includes an electrical node or junction 56 which is sensed by an analog-to-digital (A/D) converter 72 connected to the node 56 to convert the analog voltage level existing at the node 56 to a digital value for use by the control program in determining the proper wiper delay time period. Likewise, the motor drive logic 74 senses the voltage level at the node 56 to control the operation of the wiper drive motor 14. The motor drive logic 74 actuates the wiper drive motor 14 any time a voltage level other than B+ (i.e. ⅔B+, ⅓B+, 0 volts) is sensed at node 56.

A WASH switching transistor 58, a WIPE switching transistor 60, and the inner wipe (IW) position switch 62 are connected in parallel between the node 56 and the system ground. The inner wipe position switch 62 is associated with the wiper drive motor 14 and is "open" only when the wipers 12 are positioned at the bottom of the windshield 10 in the inner wipe position. The WASH transistor 58 includes a collector terminal directly connected to the node 56, an emitter terminal connected to a system ground, and a base terminal connected to a WASH signal source (not shown). The WIPE transistor 60 includes a collector terminal coupled to the node 56 through a resistor 64, an emitter terminal connected to the system ground, and a base terminal connected to a WIPE signal source (not shown). The inner wipe position switch 62 has a first terminal connected to the node 56 through a current limiting resistor 66, and a second terminal connected to the system ground. A PNP switching transistor 68 is also provided which has a base terminal thereof connected to the node 56 through a resistor 70, and a collector terminal thereof connected to the supply voltage B+. The signal levels applied to the base terminals of the WASH transistor 58 and the WIPE transistor 60 are controlled by the control program when operating in the AUTO-DELAY mode.

Figure 4:
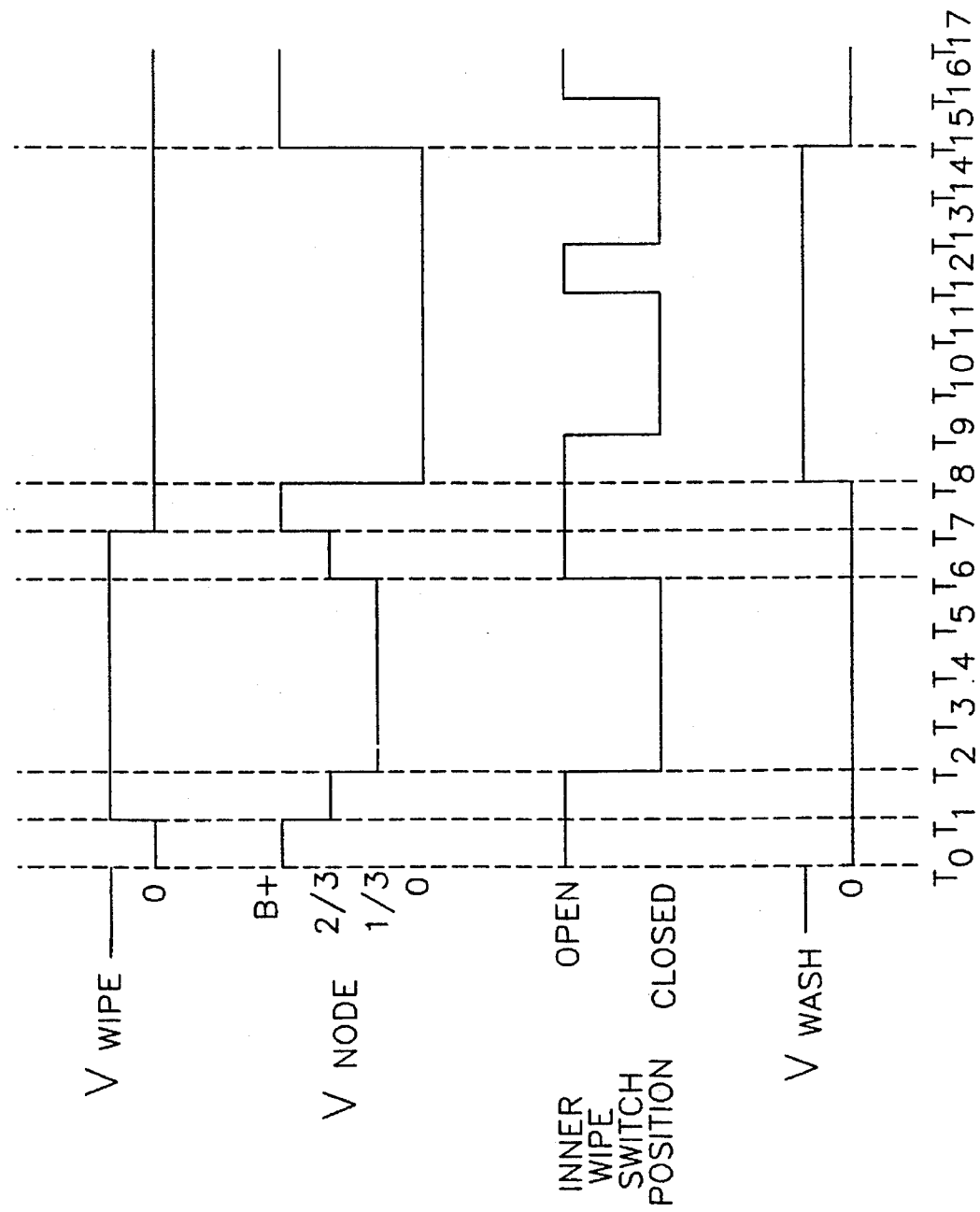
FIG. 4 is a timing diagram for the interfacing arrangement shown in FIG. 3.

The timing diagram shown in FIG. 4 depicts the operation of the multiplexed line 42 when the wiper selector switch 24 is set to any one of the AUTO-DELAY modes. At time $T_0$, the WASH and WIPE transistors 58 and 60 are not forward biased and line 42 is at the supply voltage potential B+. The B+ voltage potential is sensed at node 56 and converted to a digital representation by the A/D 72 for use by control program.

At $T_1$, the control program determines that the windshield 10 should be wiped, the auto-delay controller 36 applies a positive going signal to the base terminal of the WIPE transistor 58 which forward biases the transistor 60. With transistor 60 conducting, transistor 68 is forward biased and current flows from the supply voltage B+ through a voltage divider arrangement formed by resistors 70 and 64 to ground. The resistors 70 and 64 are sized such that ⅔ of the supply voltage B+ is dropped across resistor 64. Thus, the voltage level at the node 56 is ⅔ B+ which is sensed and converted by the A/D 72 for use by the control program resident in the auto-delay controller 36.

At $T_2$, the wiper drive motor 14 is actuated by the wiper motor controller 20. As the motor 14 drives the wipers 12 up onto the windshield 10 from the inner wipe position at the bottom of the windshield 10, the inner wipe switch 62 closes which provides a second current flow path to ground through the resistor 66 and switch 62. When the resistors 64 and 66 are placed in parallel, the voltage at node 56 drops to ⅓ B+ which is sensed and converted by the A/D 72 for use by the control program. At $T_6$, the wipers 12 are driven back to the inner wipe position and the inner wipe switch 62 opens which causes the voltage at node 54 to return to ⅔ B+ which is sensed and converted by the A/D 72 for use by the control program.

At $T_7$, the control program determines that the wipers no longer need to be operated, thus, the WIPE signal applied to the base terminal of WIPE transistor 60 is removed to reverse bias the WIPE transistor 60. With transistor 60 reverse biased the line 42 is isolated from the system ground and the node 54 is pulled back up to the B+ voltage potential. At $T_8$, the auto position decoder 54 determines that the WASH switch 50 is depressed and applies a WASH signal to the base terminal of WASH transistor 58. With transistor 58 conducting, the node 54 is pulled down to the system ground potential which is sensed and converted by the A/D 72 for use by the control program. The node 54 remains at the system ground potential until the WASH signal is removed from the base terminal of WASH transistor 58 at $T_{15}$. Advantageously, this method and circuit provide means for utilizing a plurality of transistors in an arrangement which facilitates communication between two or more components or controllers using a single bi-directional multiplexed communication path.

While the forms of the device herein described constitute the preferred embodiments of the invention, it is to be understood that the invention is not limited to these precise forms of device, and that changes may be made without departing from the scope of the invention which is defined in the appended claims.

What is claimed is:

1. An interface circuit for a windshield wiper auto-delay controller comprising:
   (a) a node;
   (b) means for applying a first reference voltage to said node;
   (c) a first resistor in communication with said node;
   (d) a second resistor in communication with said node;
   (e) a transistor responsive to a driving signal for causing a current flow through said first resistor to produce a second reference voltage at said node;
   (f) a switch responsive to a predetermined positioning of a wiper arm for causing a current flow through said second resistor to produce a third reference voltage at said node; and
   (g) an analog to digital converter for producing digitized representations of voltage levels at said node and supplying said digitized representations to said auto-delay controller.

2. An interface circuit according to claim 1 further comprising a second transistor connected to said node and responsive to a second driving signal for producing a fourth reference voltage at said node.

3. An interface circuit according to claim 2 wherein said second transistor is connected between said node and a source of ground potential, said second transistor being normally nonconducting and being responsive to said second driving signal by becoming conductive and connecting said source of ground potential to said node.

4. Control apparatus for a windshield wiper comprising:
   (a) a multi position wiper function switch for generating a selected one of a plurality of different wiper function signals;
   (b) a wiper motor;
   (c) a wiper motor controller responsive to said wiper function switch for variably operating said wiper motor;
   (d) a moisture sensor;
   (e) an auto-delay controller responsive to said moisture sensor and said wiper function switch for generating automatically timed wipe signals; and
   (f) an interface circuit for applying said wipe signals to said wiper motor controller and monitoring the response of said wiper motor thereto, said interface circuit comprising a node, means for applying said wipe signals to said node, means connecting said motor controller to said node, means for setting said node at a predetermined one of a plurality of different voltage levels corresponding to different operating conditions of said apparatus, and an analog to digital converter connected for delivering digital signals to said auto-delay controller in correspondence with said voltage levels.

5. Control apparatus according to claim 4 further comprising a wiper position switch connected for applying a predetermined voltage to said node in response to positioning of a wiper driven by said wiper motor.

* * * * *